US008746879B2

(12) United States Patent
Jiang et al.

(10) Patent No.: US 8,746,879 B2
(45) Date of Patent: Jun. 10, 2014

(54) ADHESIVE SYSTEM FOR A LAMINATED LENS AND METHOD FOR APPLYING SAME

(75) Inventors: Peiqi Jiang, Tarpon Springs, FL (US); Bruce Keegan, Seminole, FL (US)

(73) Assignee: Essilor International (Compagnie Générale d'Optique), Paris (FR)

(*) Notice: Subject to any disclaimer, the term of this patent is extended or adjusted under 35 U.S.C. 154(b) by 0 days.

(21) Appl. No.: 13/505,009

(22) PCT Filed: Nov. 2, 2009

(86) PCT No.: PCT/US2009/062923
§ 371 (c)(1),
(2), (4) Date: Apr. 30, 2012

(87) PCT Pub. No.: WO2011/053329
PCT Pub. Date: May 5, 2011

(65) Prior Publication Data
US 2012/0236255 A1 Sep. 20, 2012

(51) Int. Cl.
*G02C 1/02* (2006.01)
*G02C 5/12* (2006.01)
*G02B 5/128* (2006.01)

(52) U.S. Cl.
USPC ...... 351/159.42; 351/144; 351/139; 359/539; 359/540

(58) Field of Classification Search
USPC ............ 351/139, 144, 159.42; 359/539, 540; 156/1, 100, 103
See application file for complete search history.

(56) References Cited

U.S. PATENT DOCUMENTS

| 5,128,388 | A | 7/1992 | Komori et al. |
| 5,316,791 | A | 5/1994 | Farber et al. |
| 5,945,504 | A | 8/1999 | Amagi et al. |
| 6,489,028 | B1 | 12/2002 | Degand et al. |

(Continued)

FOREIGN PATENT DOCUMENTS

| EP | 0761665 | 3/1997 |
| EP | 0942027 | 9/1999 |

(Continued)

OTHER PUBLICATIONS

Momentive Performance Materials, "Material Safety Data Sheets," pp. 1-9, Oct. 2007 (9 pages).

(Continued)

*Primary Examiner* — Scott J Sugarman
*Assistant Examiner* — William Alexander
(74) *Attorney, Agent, or Firm* — Gardere Wynne Sewell LLP

(57) ABSTRACT

A method for laminating a functional film on to an optical base element and a tri-layer adhesive system for use in the method. The tri-layer adhesive includes a first latex adhesive layer disposed on the functional film and a second latex adhesive layer disposed on the optical base element. An HMA layer is disposed in between the latex layers to form a tri-layer adhesive to permanently retain the functionalized film on the optical base element. The method includes first coating a latex adhesive on the functional film and second coating a latex adhesive on the optical base element. An HMA is then coated on to one of the dried latex adhesive layers. The film is hot pressed on to the optical base element with the HMA sandwiched in between the latex layers to form a laminated optical device.

24 Claims, 2 Drawing Sheets

(56) References Cited

U.S. PATENT DOCUMENTS

| | | | |
|---|---|---|---|
| 6,503,631 | B1 | 1/2003 | Faverolle et al. |
| 6,562,466 | B2 | 5/2003 | Jiang et al. |
| 6,740,699 | B2 | 5/2004 | Tardieu et al. |
| 6,770,710 | B2 | 8/2004 | Robert et al. |
| 7,446,228 | B2 | 11/2008 | Wanigatunga et al. |
| 2001/0028435 | A1* | 10/2001 | Evans et al. .................. 351/163 |
| 2007/0270062 | A1 | 11/2007 | Weber |
| 2008/0023137 | A1 | 1/2008 | Jiang et al. |
| 2009/0071591 | A1* | 3/2009 | Glacet et al. .................. 156/163 |
| 2010/0163165 | A1* | 7/2010 | Jiang et al. .................... 156/230 |
| 2011/0242657 | A1* | 10/2011 | Glacet et al. ............. 359/492.01 |
| 2012/0015176 | A1* | 1/2012 | Riebel et al. .................. 428/323 |

FOREIGN PATENT DOCUMENTS

| | | |
|---|---|---|
| FR | 2897693 | 8/2007 |
| WO | 0050533 | 8/2000 |
| WO | 2006013250 | 2/2006 |

OTHER PUBLICATIONS

Bond Polymers International, L.L.C., "Material Safety Data Sheets," pp. 1-5, Sep. 2003 (5 pages).

Trivex PPG Industries, "The Technical Features of TrivexTM Lens Material," pp. 1-3 and 6-9, Apr. 2009 (7 pages).

* cited by examiner

ADHESIVE SYSTEM FOR A LAMINATED LENS AND METHOD FOR APPLYING SAME

BACKGROUND OF THE INVENTION

1. Field of the Invention

The invention relates to an adhesive system for a laminated ophthalmic lens and the related method for applying such an adhesive system between a film and an ophthalmic lens.

2. The Prior Art

Ophthalmic lenses can be tinted or otherwise modified to alter the transmission properties of the base lens. Some dyes can be incorporated into the base material before or after the lens shaping process. Other processes are applied after the lens is formed. One such process involves laminating a film on to a lens surface. These films are often referred to as functional films, which mean that they alter an optical or transmission property in some respect. Polarized films are desirable because they reduce glare without unduly limiting transmission.

There are many ways to make polarized lenses, such as by injecting a lens against a polarized film, casting a lens adjacent a polarized film or laminating the film with a glue, etc. Some prior art methods describe gluing a film by using thermal or UV curable glue or using hot melt adhesives (HMA) or using pressure sensitive adhesive (PSA). However, all these prior art methods have either optical or mechanical performance issue due to unevenness in the glue layer or lack of good adhesion. The adhesion issue is even more problematic in connection either with certain materials used to make organic lenses, or certain materials used to make films.

Therefore, the object of this invention is to provide a very even adhesive layer between lens and the film, independently of the materials used to make the lens and/or the film. This adhesive layer is pre-coated by spin method to get an even thickness on both lens and the film side.

Another object of this invention is to provide the strongest adhesion between a polarized film, such as TAC/PVA/TAC film and a plastic lens, such as epi-sulfur lens material. The new adhesive system can be used on any lens materials, since the last layer of latex could bond to any lens substrates by spin or dip applications.

Another object of this invention is to provide the flexibility of putting an HMA layer either on the lens or on the film depending on the process. With many different types of spin equipment, it will be easier to put an HMA layer on a lens surface rather than a film surface.

SUMMARY OF THE INVENTION

This invention relates to a method to achieve a much stronger adhesion between a plastic lens and a functionalized film by introducing a multi adhesive layer system, namely Latex/HMA/Latex, between said plastic lens and said functionalized film. The use of this multi adhesive layer system is especially important to insure good adhesion for the highest index epi-sulfur material, which is a 1.74 index material and is very difficult to bond compared to other lens materials due to the chemical nature of this polymer.

Among functionalized films, polarized film presents one of high interest for ophthalmic lenses. Adhesion between polarized film and a plastic lens is always a challenge to make a good polarized plastic lens by film lamination process. The common methods in the prior arts were to use a UV or thermal curable adhesive or a hot melt adhesive or pressure sensitive adhesive. However, there are some draw backs when using these types of adhesive, such as lack of good adhesion, uneven glue thickness, not easily handle, cosmetic defects, etc.

Therefore, in this invention, a new concept of multi layer adhesive system is proposed which provides very strong adhesion between a polarized film and a cast plastic lens. The multi adhesive layers have three functions 1) one latex layer has good bond to film; 2) the other latex layer has good bond to lens; 3) the middle adhesive of HMA provides a good bond between film and the lens which has been coated by latex adhesive. All three layers are water based polymers that can be easily spin coated on the film and lens before lamination. Then, the two parts are laminated together by hot press equipment in few minutes. The resulting lens had the strongest adhesion compared to other system and also showed good optics due to an even adhesive layer, and high cosmetic quality. Furthermore, the resulting lens presents very good mechanical performance which is compatible with various edging process, in order to obtain the lens that is fitted into a frame for a pair of spectacles.

BRIEF DESCRIPTION OF THE DRAWINGS

The advantages, nature, and various additional features of the invention will appear more fully upon consideration of the illustrative embodiments now to be described in detail in connection with accompanying drawings.

DETAILED DESCRIPTION OF THE PREFERRED EMBODIMENTS

Figure 1:
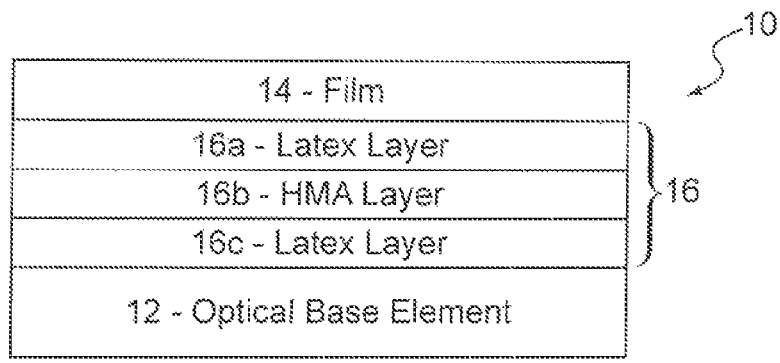
FIG. 1 is a schematic diagram of a laminated lens having a tri-layer adhesive structure.

The principle of this invention is to use a multi adhesive layer between a functionalized film and a lens. The first and the third adhesive layer is the latex layer which can bond to both the functionalized film (such as polarized film) and lens well by spin, the second middle adhesive layer is a hot melt adhesive layer which is used for good lamination bond between the film and the lens, through the corresponding latex layers. The HMA adhesive layer can be applied on either the film side or the lens side. By using the combination of these multi layers, we are able to bond any films to any lens materials very well in a very short of time with the strongest adhesion force. The layers contained in this multi-adhesive system are shown in FIG. 1. More particularly, this invention is very useful to functionalized a high index material like epi-sulfur lens material and a polarized film based on a PVA (polyvinyl alcohol) layer sandwiched between two identical or different material layers selected from, for example, TAC (cellulose triacetate), CAB (cellulose acetate butyrate), or PC (polycarbonate).

A laminated optical element 10 is shown in which a layered structure or film 14 is laminated to an optical base element 12. In one embodiment a functionalized layered structure or functional film 14 is laminated to a lens. Where, the first latex layer 16a and a second HMA layer 16b can be applied on a functionalized film and a third latex layer 16c can be applied on lens 12 in advance and separately by spin or dip to get very uniform adhesive layers. Or the latex layer 16c and the HMA layer 16b can be applied to lens 12 and a third latex layer 16a applied on film 14. Either way this three-layer adhesive system, collectively referred to as reference numeral 16, can bring the best adhesion between a film and a lens. To improve the adhesion between latex and the film or the lens, a pre-treating like corona treating; caustic treating; plasma treating or UV treatment on lens or on film could be required. Surprisingly, the adhesion decreases and results in a poor quality product when the multi-adhesive system is applied as a whole either to the lens or to the film.

After the functionalized film was coated by latex and HMA layer and the lens was coated by latex, the film is laminated to said latex coated lens by a system under pressure, temperature and time control conditions, which are defined depending the material used to the functionalized film and the material used for the lens. For example, using as functionalized film a TAC/PVA/TAC polarized film and as lens an epi-sulfure material like 1.71 material, the lamination condition of the hot press device may be 25 PSI pressure and 120° C. (setting temperature) for 5 min. After lamination, a functionalized lens is obtained with the strongest adhesion between film and the lens. Thanks to the even adhesive thickness, the obtained lens has very good optics and it respected the original optical design, which is most important when the front side curve is a progressive design. Furthermore the obtained functionalized lens can pass any kind of Rx surfacing process including wet edging process without any de-lamination. It can also pass regular Hardcoating or AR coating process.

Therefore, the multi adhesive layer concept can bring ultimate adhesion force and the lens performance than other adhesive methods.

There are three key steps in this invention: first is to apply a double adhesive layers on a functionalized film or on a lens, second is to apply to third adhesive layer on a plastic lens or on a film, and the third is to laminate the film to the plastic lens. Applying the adhesive layers on both functionalized film and the lens could be done by classic spin or dip methods in advance. Spin coating is a particularly preferred method. Lamination of a film to plastic lens could be done in hot press device within a very short of time. Of course, other intermediate processes can be introduced.

Figure 2:
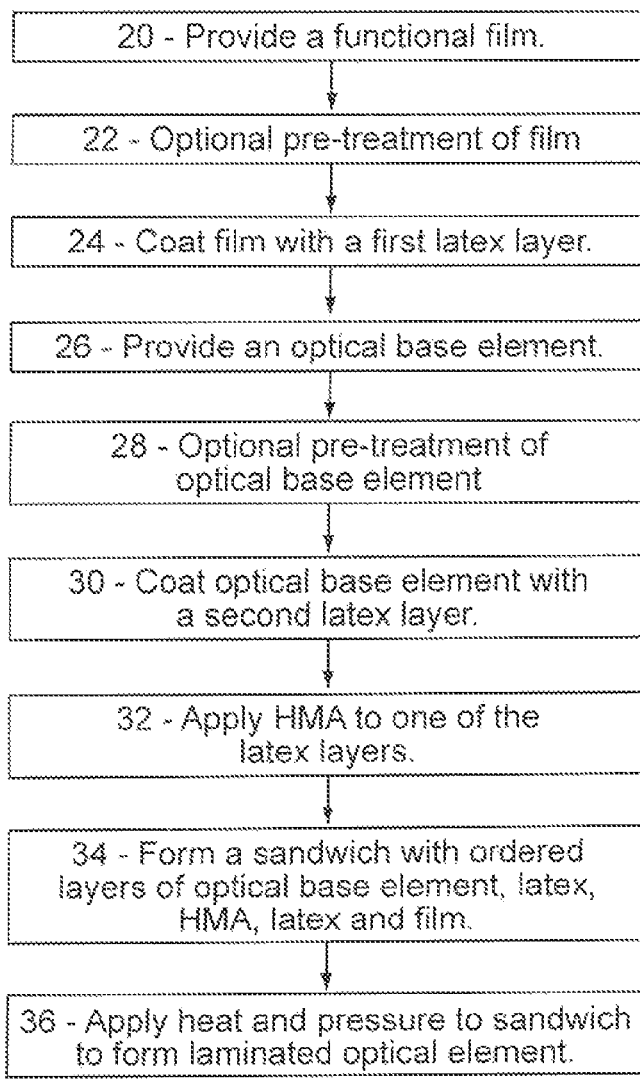
FIG. 2 is a flowchart illustrating a method of laminating a lens.

A more comprehensive description of the process may be seen in the flowchart of FIG. 2. Beginning in step 20, there is provided a functionalized layered structure or functional film, which alters an optical or transmission property, for example a polarized film. The film may be thermoformed to a base curve similar to the lens. In other words, the concave side of the thermoformed film will have similar shape as the convex side of the lens.

Additional process steps 22 can be performed at this stage. For example, to improve the adhesion between latex and the film, a pre-treatment like corona discharge; treating with caustic agents; plasma treating or UV treatment may be performed on the film.

In step 24, a first latex layer is coated on to the concave side of the film. Any suitable optical coating method may be employed, for example, spin coating or dip coating, spin coating being preferred. The latex layer is applied in a liquid form and then dried. Low levels of heat may be applied to speed drying.

In step 26, there is provided an optical base element, for example, a plastic lens. In one embodiment, the adhesive system according to the invention had excellent results on cast lenses, for example, lens cast from TRIVEX or epi-sulfur monomers. Additional process steps 28 can be performed at this stage. For example, to improve the adhesion between latex and the lens, a pre-treatment like corona discharge; treating with caustic agents; plasma treating or UV treatment may be performed on the lens.

In step 30, a second latex layer is coated on to the optical base element, for example on to the convex side of a lens. Any suitable optical coating method may be employed, for example, spin coating or dip coating, spin coating being preferred. The latex layer is applied in a liquid form and then dried. Low levels of heat may be applied to speed drying.

In step 32, an HMA is applied to one of the dried latex layers. These options are more fully described below in connection with FIGS. 3A and 3B. Any suitable optical coating method may be employed, for example, spin coating or dip coating, spin coating being preferred. The HMA layer is applied in a liquid form and then dried. Low levels of heat may be applied to speed drying.

In step 34, a sandwich is formed by aligning the concave surface of the film with the convex surface of the lens. As the film is brought into contact with the lens, one of the dried latex layers will be facing the dried HMA layer. The sandwich will include ordered layers of lens, latex, HMA, latex and film.

In step 36, the sandwich is subject to heat and pressure to form a laminated lens. The lens is supported from underneath, while a suitable member presses the film under controlled pressure, while heat is applied. Specific tests and experiments were carried out following the steps of the method just described. The tests and their results are presented herein by way of several examples and comparative examples, with results posted in corresponding tables.

Figure 3A:
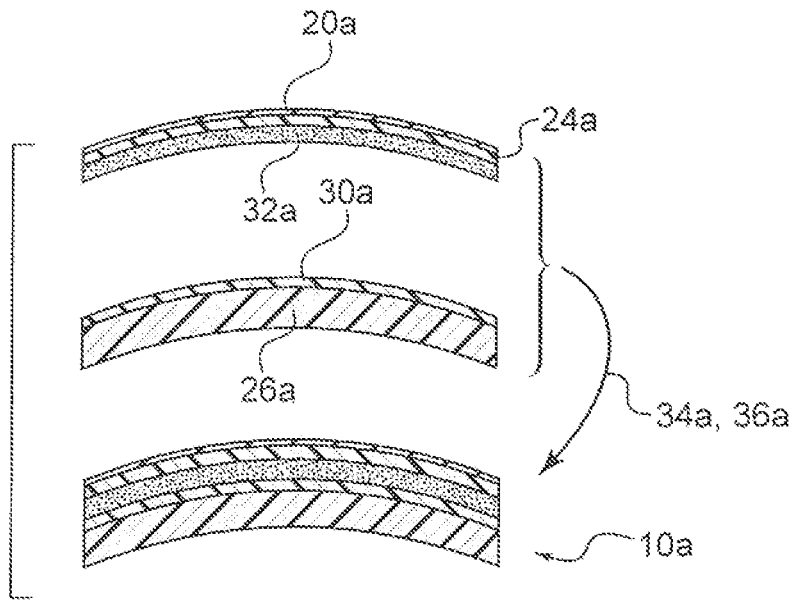
FIG. 3A is a diagram showing an embodiment of the pre-laminated elements.

FIG. 3A illustrates one embodiment of applying the tri-layer adhesive system 16. A functionalized film 20a is coated with a first latex layer 24a. An optical base element 26a, for example a lens, is coated with a second latex layer 30a. An HMA layer 32a is applied to the first latex layer 24a. A sandwich is formed 34a with ordered layers of optical base element, latex, HMA, latex and functional film. Heat and pressure is applied 36a to the sandwich to form a laminated optical element 10a.

Figure 3B:
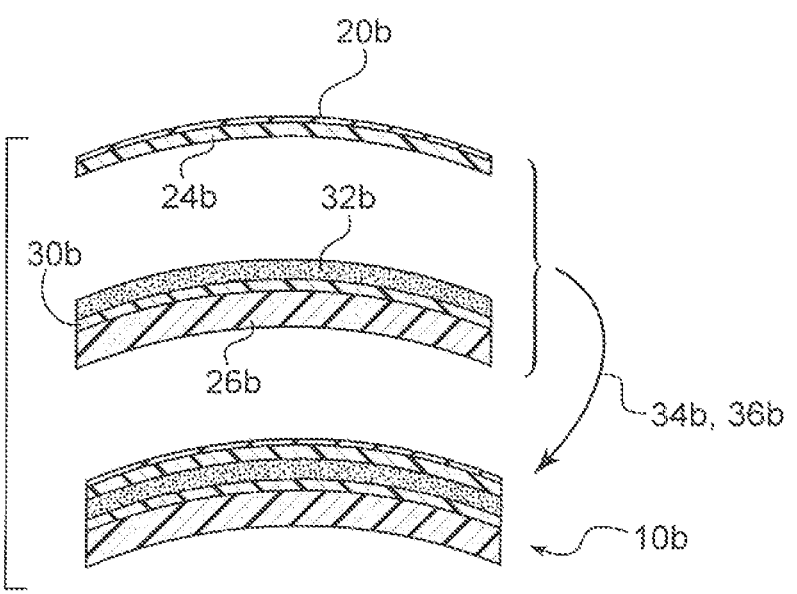
FIG. 3B is a diagram showing another embodiment of the pre-laminated elements.

FIG. 3B illustrates another embodiment of applying the tri-layer adhesive system 16. A functionalized film 20b is coated with a first latex layer 24b. An optical base element 26b, for example a lens, is coated with a second latex layer 30b. An HMA layer 32b is applied to the second latex layer 30b. A sandwich is formed 34b with ordered layers of optical base element latex, HMA, latex and functional film. Heat and pressure is applied 36b to the sandwich to form a laminated optical element 10b.

The tri-layer adhesive is useful in laminating to optical base elements made from plastic which could be thermoplastic or thermoset material. The base elements could be made from any suitable optical thermoset material including polyurethanes, CR-39, and high index poly(thio)urethanes or episulfide, for example 1.67 and 1.74 materials. An exemplary list of plastics includes polycarbonate, thermoplastic polyurethane, polyamide, polyimide, polysulfone, copolymers of polyethyleneterephthalate and polycarbonate, polyolefin, homopolymers and copolymers of diethylene glycol bis(allylcarbonate), homopolymers and copolymers of (meth) acrylic monomers, homopolymers and copolymers of thio (meth)acrylic monomers, homopolymers and copolymers of urethane, homopolymers and copolymers of thiourethane, epoxy homopolymers and copolymers, and episulfur homopolymers and copolymers. In a preferred embodiment the optical base element comprises a cast lens, for example, made from copolymer of urethane like Trivex or an episulfide monomer.

The tri-layer adhesive is useful in laminating to either the convex or the concave side of optical base elements, for example, ophthalmic lenses. The lenses may be sunglasses, plano lenses, visors, or prescription (Rx) lenses. Such lenses may include finished lenses (F), semi-finished lenses (SF), progressive addition lenses (PAL), multifocal lenses, unifocal lenses and afocal lenses. The optical base element may be clear, tinted or dyed.

The functionalized layered support may comprise a film that contributes an optical or performance function to the optical base element. In addition, the functionalized layered support may comprise a multi-functional film that contributes at least one optical function, at least one performance function, or combinations thereof. Examples of optical functions include polarizing and photochromically enabling optical elements. Such functions are realized by polarized films and photochromic films, respectively. Polarizing materials are commercially available as polyethylene terephthalate (PET) film or polyvinyl acetate (PVA) film encapsulated by two cellulosed films of two major types: cellulose triacetate (TAC) films and cellulose acetate butyrate (CAB) films. Other functionalized layer films could be PET, or TAC or other polymer based film material (COO-cyclic olefin/PC-polycarbonate) which bear at least one of the following functions: antireflective, hard coat, top-coat, antistatic, anti-fog, or anti-smudge, or microstructured films as described for example in WO2006/013250. Such functions are realized in the form of hard multi-coat (HMC) films which have several layers optionally capped by a top coat film. In a preferred embodiment of the invention, a polarizing film is adhered to an optical base element to provide a polarized lens.

The functionalized layered element will have one surface designated for contact with the optical base element. Following any optional pre-treatment steps, this contact surface will receive a layer of latex adhesive, applied so as to achieve optical quality and good bond to the functionalized layered element. The various application processes shall be described in greater detail below. The application step involves drying the latex layer so that a thin, solid layer of latex remains. The dried latex layer shall be of sufficient purity to display color, transmission and clarity at a level consistent with optical quality ophthalmic lenses. In addition, the latex layer shall possess a uniform thickness across its surface. Uniform thickness refers to a layer which has a consistent thickness that varies by less than 0.01 microns to 0.3 microns.

Latex materials meeting such requirements that may be used in the invention include polyurethane latex, acrylic latex, and core/shell latex. For example, (meth)acrylic such as acrylic latexes commercialized under the name Acrylic latex A-639 by Zeneca, polyurethane latexes such as the latexes commercialized under the names W-213, W-240 and W-234 by Baxenden, or a polyurethane latex based on this commercialized product, or silane based latex like A-1100 (gamma-aminopropyltriethoxysilane) commercialized by Momentive. Preferably, polyurethane latexes are utilized in the practice of the invention and more particularly such latexes as described in U.S. Pat. No. 5,316,791. Other preferred latexes are core/shell latexes such as those described in U.S. Pat. No. 6,503,631 and U.S. Pat. No. 6,489,028. Other preferred latexes are alkyl(meth)acrylates such as butylacrylate or butyl (meth)acrylate.

The latex materials may optionally be blended with additives to adjust the rheological, mechanical or optical properties thereof. For example, a coupling agent may be added to the latex material to promote adhesion to the functionalized layered support as described in U.S. Pat. No. 6,770,710 and U.S. Pat. No. 6,740,699.

HMA materials meeting such requirements that may be used in the invention include polyurethane based HMA materials. These materials are characterized as aqueous anionic dispersions of high molecular weight polyurethane. Types of HMAs commercially available from Bayer include Dispercoll® U 42 and KA-8758. Bond Polymers International LLC has commercialized two waterborne polyurethane dispersions which are useable in the present invention: Bondthane® UD-104 and Bondthane® UD-108. The HMA materials may optionally be blended with additives to adjust the rheological, mechanical or optical properties thereof. For example, additives, such as colloid silica, can be added to the HMA formulation to facilitate crosslinking to improve the hardness and durability. A suitable colloid could be LUDOX® SM-30 colloidal silica, 30 wt % suspension in H2O. The percentage of colloid in HMA could be in the range of 1-20 wt % and with a preferred range of 2-10 wt %. The HMA materials in this invention can also be any known polymer for formulating a hot melt adhesive, but is preferably a thermoplastic polymer. Thus, an HMA polymer can be chosen from amongst polyolefins, polyamides, polyurethanes, polyurethane/ureas, polyvinylpyrrolidones, polyesters, polyesteramides, poly (oxazolines) and poly(meth)acrylic systems. Suitable polyolefins are disclosed in particular U.S. Pat. No. 5,128,388. Preferred polyolefins are block thermoplastic elastomers such as block elastomers comprising polystyrene blocks, polybutadiene blocks, polyisoprene blocks or ethylene-butylene copolymer blocks. Besides, any kinds of UV/thermal curable HMA or HMA blend with UV/thermal curable monomers adhesive layers can be used in this invention as a second adhesive layer. In the present invention, preferred HMA is selected from heat-activatable polyurethane adhesive, a UV curable HMA, and a thermal curable HMA. More particularly, better results are obtained using a holt melt adhesive layer presenting a modulus above 1.5 MPa.

The following examples utilize a TAC polarized film and an episulfide lens material having in index of refraction of 1.74. More particularly, the TAC film comprises a PVA polarized layer that is sandwiched between two TAC layers to form a unitary film, in which the PVA is protectively encased within the TAC outer layers.

Example 1

A TAC polarized film was first thermoformed to a curve close to the front side of an epi-sulfur lens material with an index of 1.74. The convex side (front side) of the TAC polar film was washed with a caustic solution (10% NaOH) followed by DI water rinse, and then a latex based on W-234 material was spun on the film. After the latex layer dried, a HMA solution of UD104 from Bond Polymer Inc, was spun on top of the latex and set to dry for 2 minutes at 60° C. A third layer of the same first latex was applied onto the convex side (front side) of the 1.74 lens under the same condition as the latex on the film, including a caustic wash and water rinse.

Finally, the dried double adhesive layer coated film was then laminated to a latex coated 1.74 epi-sulfur lens with a small hot press accumulator device having a lens support and an inflatable silicon membrane. The convex side of the film, covered with the HAM-latex adhesive layer was put in contact with the convex side of the lens covered with the latex-layer. The pressure was slowly increased to 30 PSI to achieve full contact between the film and the lens at the set temperature of 120 degrees C. for 5 minutes.

After lamination, the/obtained polarized lens showed very good adhesion between lens and the film. There was no delamination even after a severe Rx surfacing, polishing and wet edge cutting. The adhesion force between film and lens after lamination was measured by Instron equipment as shown in Table 1A.

Examples 2-4

Example 1 was repeated except the 1.74 lens was pre-treated by chemical treatment and one other treatment selected from corona, plasma and UV before latex applied onto it. The obtained lens had a much stronger peel force between the film and the lens as shown in Table 1A.

Example 5

Example 2 was repeated except a UD 108 HMA was used instead of UD104. The obtained lens had acceptable peel force between the film and the lens as shown in Table 1A.

Example 6

Example 5 was repeated except that the one latex layer was applied on a TAC film and second (HMA) and third (latex) adhesive layers were applied on the 1.74 lens that was pre-treated by UV before latex and HMA was applied onto it. The obtained lens had an acceptable peel force between the film and the lens as shown in Table 1A.

TABLE 1A

Examples of Three adhesive layer system for film lamination on 1.74 lens material

| | Examples | | | | | |
|---|---|---|---|---|---|---|
| | Ex. 1 | Ex. 2 | Ex. 3 | Ex. 4 | Ex. 5 | Ex. 6 (Latex and HMA both on lens) |
| TAC Film | TAC Film | TAC Film | TAC Film | TAC Film | TAC Film | TAC Film |
| First Adhesive Layer | Latex | Latex | Latex | Latex | Latex | Latex |
| Second Adhesive Layer | UD104 | UD104 | UD104 | UD104 | UD108 | UD108 |
| Third Adhesive Layer | Latex | Latex | Latex | Latex | Latex | Latex |
| Lens Surface pre-treatment before latex | Caustic wash bnly | Caustic wash and UV treatment | Caustic wash and corona treatment | Caustic wash and plasma treatment | Caustic wash and UV treatment | Caustic wash and UV treatment |
| Lens material | 1.74 | 1.74 | 1.74 | 1.74 | 1.74 | 1.74 |
| Peel force by Instron | 25N | 60N | 50N | 55N | 36N | 33N |
| Peel by Hand | Hard | Hardest | Hardest | Hardest | Hardest | Hardest |
| Rx surfacing and wet edge delamination | Good | Good | Good | Good | Good | Good |
| Hardcoating | Good | Good | Good | Good | Good | Good |
| Optical deformation | No | No | No | No | No | No |

Comparative Ex. 1

Example 1 was repeated except the 1.74 lens was without an latex adhesive layer and with a caustic wash. The obtained lens showed very poor adhesion between lens and the film. The film could be easily peeled off from the lens by hand as shown in Table 1B.

Comparative Ex. 2

Example 1 was repeated except the 1.74 lens was without an latex adhesive layer and was pre-treated only by UV. The obtained lens showed very poor adhesion between lens and the film. The film could be easily peeled off from the lens by hand.

Comparative Ex. 3

Comparative Ex. 1 was repeated except a UD108 HMA from Bond polymer Inc was used instead of UD104. The obtained lens showed very poor adhesion between lens and the film. The film could be easily peeled off from the lens by hand as shown in Table 1B.

Comparative Ex. 4

Example 1 was repeated except that the latex applied on the lens surface was replaced by a HMA layer of UD104. Though there were three adhesive layers between the film and the lens, the obtained lens had very poor adhesion between the lens and the film. As shown in Table 1B, the film could be easily peeled off from the lens by hand, because the three layer system should be latex/HMA/latex between the film and the lens in order to bring about the best adhesion.

Comparative Ex. 5

Example 2 was repeated except there was no HMA between the film and the lens. Though both film and lens were coated with latex and the 1.74 lens was even pre-treated by UV, the obtained lens had very poor adhesion between the lens and the film. As shown in Table 1B, the film could be easily peeled off from the lens by hand, because there was no HMA layer of either UD104 or UD108.

TABLE 1B

Comparative Examples of Three adhesive layer system for film lamination on 1.74 lens material

| | Examples | | | | |
|---|---|---|---|---|---|
| | Comparative Ex. 1 | Comparative Ex. 2 | Comparative Ex. 3 | Comparative Ex. 4 | Comparative Ex. 5 |
| TAC Film | TAC Film | TAC Film | TAC Film | TAC Film | TAC Film |
| First Adhesive Layer | Latex | Latex | Latex | Latex | Latex |
| Second Adhesive Layer | UD104 | UD104 | UD108 | UD108 | No HMA |
| Third Adhesive Layer | No Latex | No Latex | No Latex | No Latex, but with UD104 | Latex |
| Lens Surface pre-treatment before latex | Caustic wash only | Caustic wash and UV treatment | Caustic wash only | Caustic wash only | Caustic wash and UV |
| Lens Material | 1.74 | 1.74 | 1.74 | 1.74 | 1.74 |
| Peel force by Instron | 14N | 14N | 12N | 18N | 8.6N |
| Peel by Hand | Easy | Easy | Easy | Easy | Easy |
| Rx surfacing and wet edge delamination | Some delaminated | Some delaminated | Some delaminated | Some delaminated | Some delaminated |
| Hardcoating | Some delaminated | Some delaminated | Some delaminated | Some delaminated | Some delaminated |
| Optical deformation | N/A | N/A | N/A | N/A | N/A |

Example 7

Example 5 was repeated except a PC (thermoplastic polycarbonate) lens was used. The obtained lens had a much stronger peel force between the film and the lens compared to the lens without latex layer on the lens as shown in Table 2.

Comparative Ex. 7

Example 7 was repeated except a PC lens was used with no latex adhesive on it. The obtained lens had much less peel force between the film and the lens compared to the lens with the latex layer on the lens as shown in Table 2.

Example 8

Example 1 was repeated except a Trivex® lens material was used to replace the 1.74 lens material. The resulting laminated lens had a much stronger peel force between the film and the lens compared to the lens without the latex layer on the lens as shown in Table 2.

Comparative Ex. 8

Example 8 was repeated except a Trivex lens with no latex adhesive on it was used. The obtained lens had much less peel force between the film and the lens compared to the lens with the latex layer on the lens as shown in Table 2.

TABLE 2

Examples of three layer adhesive vs two layer adhesive on PC and Trivex lens materials

| | Examples | | | |
|---|---|---|---|---|
| | Ex. 7 | Comparative Ex. 7 | Ex. 8 | Comparative Ex. 8 |
| TAC film | TAC film | TAC film | TAC film | TAC film |
| First Adhesive Layer | Latex | Latex | Latex | Latex |
| Second Adhesive Layer | UD108 | UD108 | UD104 | UD104 |
| Third Adhesive Layer | Latex | No Latex | Latex | No Latex |
| Lens Surface pre-treatment before latex | Caustic Wash only | Caustic Wash only | Caustic Wash only | Caustic Wash only |
| Lens material | PC | PC | Trivex | Trivex |
| Peel force by Instron | 45N | 21N | 33N | 12N |
| Peel by Hand | Much Harder | Hard | Harder | Easy |

As can be seen by the examples above, the adhesive system provides a polarized lens by lamination. Since the various layers of the adhesive system can be applied evenly, the resulting polarized lens has excellent optical qualities. The adhesive system can also be used in any kind of from side or backside film lamination such as HC or HMC film lamination or functional film lamination, etc. The tri-adhesive layers system is the preferred solution for 1.74 episulfide lens and Trivex lens, but it works very well for all other substrate materials.

According to this process, each latex later acts as a co-adhesive to bond to the lens and film when applied in a liquid stage via spin coating. The latex/HMA/latex layers cannot all be stacked together on the lens or film. The HMA must remain exposed when entering the lamination step in order to serve as the main lamination adhesive.

TRIVEX® is a registered trademark of PPG Industries of Pittsburgh, Pa. TRIVEX is a urethane based pre-polymer which is cast in molds and thermally cured.

Suitable episulfide compounds are polyepisulfide monomers that are polymerizable compositions. For example, diepisulfide monomers disclosed in EP 942 027, U.S. Pat. No. 5,945,504, and EP 761,665 may be used.

Any suitable optical grade latex can be used which bonds well to the lens or the polarized film. While two different latex materials can be used, good results were obtained by using the same latex. Each latex layers thickness could be from 0.5 micro to 6 micros, and preferred thickness is 1 micro to 3 micros.

Latex materials meeting such requirements that may be used in the invention include polyurethane latex, acrylic latex, and core/shell latex. For example, (meth)acrylic such as acrylic latexes commercialized under the name Acrylic latex A-639 by Zeneca, polyurethane latexes such as the latexes commercialized under the names W-213, W-240 and W-234 by Baxenden, or a polyurethane latex based on this commercialized product. Preferably, polyurethane latexes are utilized in the practice of the invention and more particularly such latexes as described in U.S. Pat. No. 5,316,791. Other preferred latexes are core/shell latexes such as those described in U.S. Pat. No. 6,503,631 and U.S. Pat. No. 6,489,028. Other preferred latexes are alkyl(meth)acrylates such as butylacrylate or butyl(meth)acrylate.

The latex materials may optionally be blended with additives to adjust the rheological, mechanical or optical properties thereof. For example, a coupling agent may be added to the latex material to promote adhesion to the functionalized layered support. The latex material may include a cosmetic or photochromic dye or color dye or functional materials, such as anti-static materials. For example, as described in EP 1161512, U.S. Pat. No. 6,770,710 and U.S. Pat. No. 6,740,699.

Alternatively, a selective silane adhesive could be used to initially coat the lens or the polarized film, an organofunctional silane ester, like Silquest A-1100 silane can be used, which is available from Momentive Performance Materials of Friendly, W. Va. The silane adhesive layer should be less than 0.5 micro thick.

Any suitable optical grade HMA can be used which bonds well to the latex or silane adhesive. The HMA layer thickness could be from 2 micros to 20 micros, and preferred thickness is 4 micros to 14 micros. Another example is BONDTHANE® UD-104 and UD-108 available from Bond Polymer international Corp. of Seabrook. N.H. UD-104 and UD-108 are water based polyurethane dispersions for adhesive applications.

While polyurethane adhesives work well with polyurethane lenses, they do not adhere well to episulfide materials. It is believed that the sulfur in the lens materials interferes with the bond. Accordingly, by providing a latex layer on the lens, a receptive surface is provided for good adhesion with the HMA.

Any optical grade hot-press process may be utilized which combines heat and pressure. For example, suitable processes include FSL, BST, FST, and lamination with the Mars device. In the examples given, FSL was utilized.

The Equipment used for the peel force measurements was the Instron model 3365 with Load cell: 100N; the Max. Test Method; speed=2.54 mm/min; width=25.4 mm; thickness=0.19 mm; max length=50 mm; and minimum length=14 mm.

Sample preparation: 1. The peel force sample was prepared by adhering a 19 mm wide piece of scotch tape on an edge of a lens prior to lamination for ease of peel force test. Next, the film with the HMA adhesive system was laminated to the lens. Approximately 24 hours after lamination, a 25.4 mm strip was cut across the laminated lens at a 90 degree angle to the pre-taped portion of the lens.

Having described preferred embodiments for lens manufacturing, materials used therein for adhesives and films and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A functionalized optical element comprising:
    an optical base element; and
    a functionalized layered structure incorporating at least one functional layer which is glued directly to the optical base element to form a functionalized optical element, wherein the optical element further includes a tri-layer adhesive structure which comprises (i) a layer of latex adhesive disposed on a surface of said functionalized layered structure, (ii) a second layer of latex adhesive disposed on a surface of said optical base element, and (iii) a layer of hot melt adhesive disposed in between said latex layers to form a tri-layer adhesive that strongly retains the functionalized layered structure on the optical base element while maintaining optical quality.

2. The functionalized optical element of claim 1, wherein said latex adhesive layers comprises a material selected from the group consisting of an acrylic latex, a (meth)acrylic latex, a polyurethane latex, a core/shell latex, and combinations thereof.

3. The functionalized optical element of claim 2, wherein said latex layer comprises a dry, solid layer of between 0.5 microns and 6 microns thick with a uniform thickness throughout to provide optical quality.

4. The functionalized optical element of claim 2, wherein said latex layer comprises a dry, solid layer of between 1.0 microns and 3.0 microns thick with a uniform thickness varying by less than 0.5 microns throughout to provide optical quality.

5. The functionalized optical element of claim 1, wherein said hot melt adhesive layer includes one or more of heat-activable polyurethane adhesive, a UV curable HMA, and a thermal curable HMA.

6. The functionalized optical element of claim 1, wherein said hot melt adhesive layer includes one or more of a polymer HMA, a thermoplastic polymer HMA, and a colloid.

7. The functionalized optical element of claim 1, wherein said hot melt adhesive layer includes a heat-activable polyurethane adhesive.

8. The functionalized optical element of claim 1, wherein said hot melt adhesive layer has a modulus above 1.5 MPa.

9. The functionalized optical element of claim 7, wherein the HMA layer comprises a dry, solid layer between 2.0 microns and 20 microns with a uniform thickness throughout to provide optical quality.

10. The functionalized optical element of claim 8, wherein the HMA layer comprises a dry, solid layer between 4 microns and 14 microns with a uniform thickness varying by less than 1.0 microns throughout to provide optical quality.

11. The functionalized optical element of claim 1, wherein the functionalized layered structure includes one or more layers selected from the group consisting of:
an optical function layer,
an optical structured layer:
a Fresnel lens structure;
a polarizing layer;
a photochromic layer;
a hard coat layer;
a top coat layer;
an anti-fog layer,
an anti-smudge layer,
an anti-reflective layer; and
an anti-static layer.

12. The functionalized optical element of claim 1, wherein the functionalized layered structure represents a polarizing film alone or sandwiched between two identical or different layers consisting of a thermoplastic material or a cellulose derivatives material.

13. The functionalized optical element of claim 1, wherein the optical base element is selected from the group consisting of a finished lens, a semi-finished lens, a progressive lens, an afocal lens, a plano lens, a unifocal lens, and a multifocal lens.

14. The functionalized optical element of claim 1, wherein the optical base element is an optical base element made from urethane based pre-polymer or an episulfide monomer.

15. The functionalized optical element of claim 1, wherein the optical base element is a cast lens, and wherein the functionalized layered structure includes a polarizing film, and wherein the latex layers are polyurethane latex adhesives, and wherein the HMA is a polyurethane HMA, which collectively form a laminated polarized ophthalmic lens.

16. A method for manufacturing a functionalized optical element comprising the following steps:
providing an optical base element;
providing a functionalized layered structure that includes at least one functional layer,
first coating a layer of latex adhesive onto one surface of said functionalized layered structure;
second coating a layer of latex adhesive onto one surface of said optical base element;
third coating a layer of hot-melt adhesive onto one of the dried latex adhesive layers; and
hot pressing the functionalized layered structure against the optical base element with the second HMA coating layer in between said latex layers in contact with a surface of the optical base element to form a functionalized optical element containing a tri-layer adhesive lamina of optical quality with strong adhesion.

17. The method of claim 16, wherein prior to said second coating step, the method further includes the step of:
surface treating the optical element with at least a caustic treatment, and optionally with a UV treatment, a plasma treatment or a corona treatment.

18. The method of claim 16, wherein said first coating step comprises spin coating a liquid polyurethane latex adhesive to a final dry thickness of between 0.5 microns and 6 microns.

19. The method of claim 16, wherein said second coating step comprises spin coating a liquid polyurethane HMA to a final dry thickness of between 2 micron and 20 microns.

20. The method of claim 16, wherein the functionalized layered structure includes one or more layers selected from the group consisting of:
an optical function layer,
an optical structured layer;
a Fresnel lens structure;
a polarizing layer;
a photochromic layer;
a hard coat layer;
a top coat layer;
an anti-fog layer,
an anti-smudge layer,
an anti-reflective layer; and
an anti-static layer.

21. The method of claim 20, wherein the functionalized layered structure includes a polarizing film.

22. The method of claim 20, wherein the optical base element is a thermoplastic optical base element selected from the group consisting of a finished lens, a semi-finished lens, a PAL lens, an afocal lens, a plano lens, a unifocal lens, and a multifocal lens.

23. The method of claim 20, wherein the optical base element is an optical base element made from a urethane based pre-polymer or an episulfide monomer and is selected from the group consisting of a finished lens, a semi-finished lens, a PAL lens, an afocal lens, a plano lens, a unifocal lens, and a multifocal lens.

24. The method of claim 20, wherein the optical base element is a cast lens, and wherein the functionalized layered structure includes a polarizing film, which collectively form a laminated polarized ophthalmic lens.

* * * * *